3,443,722
PLASTIC CASE
Harold S. Cloyd, Charles A. Bernhardt, and Robert T. Mangold, Erie, Pa., assignors to Nosco Plastics, Incorporated, Erie, Pa., a corporation of Pennsylvania
Filed Jan. 21, 1966, Ser. No. 522,136
Int. Cl. B65d 21/00
U.S. Cl. 220—97         7 Claims

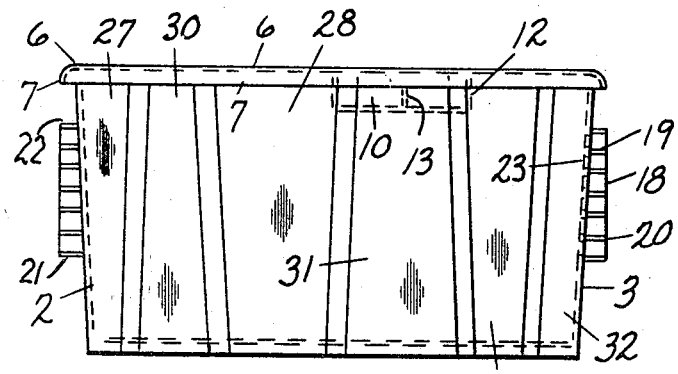
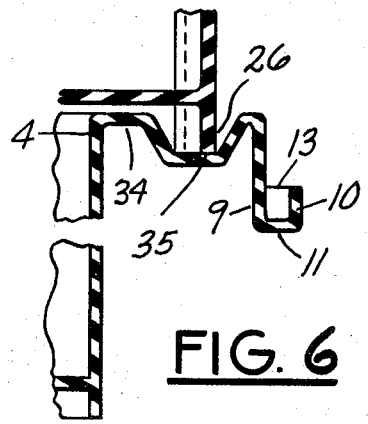
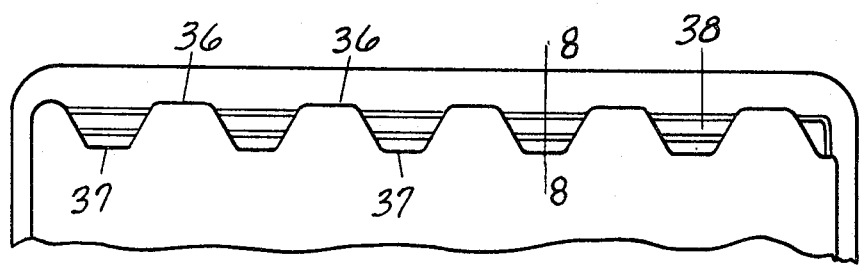
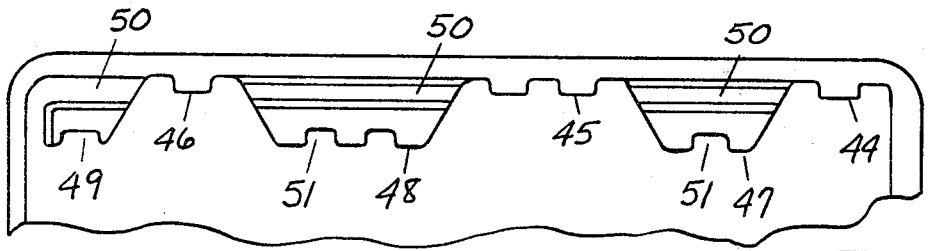
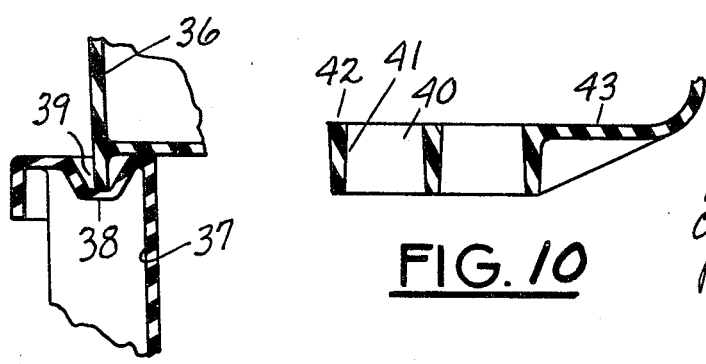

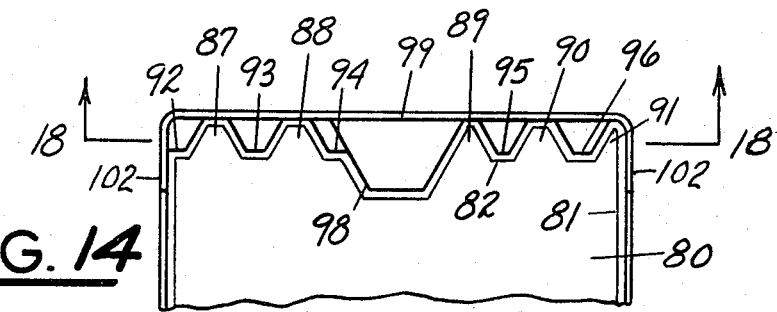
FIG. 14
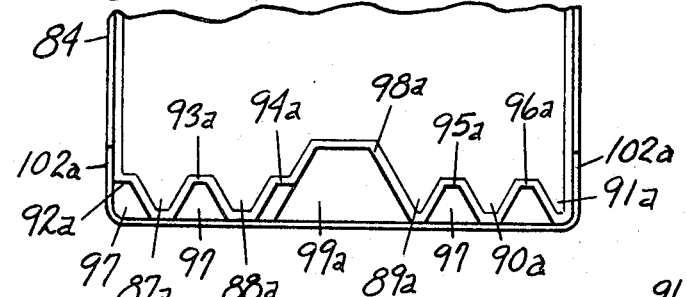
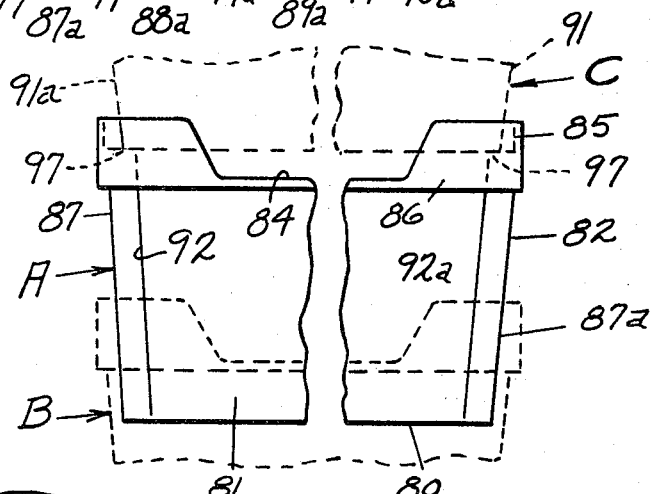
FIG. 15
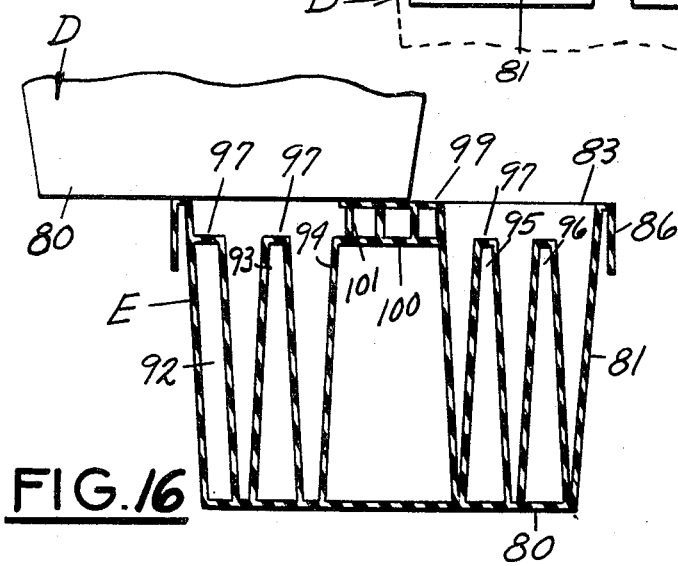
FIG. 16
Harold S Cloyd
Charles A Bernhardt
Robert V Mangold
INVENTOR.
BY Ralph Hammar
Attorney United States Patent Office 3,443,722
Patented May 13, 1969

ABSTRACT OF THE DISCLOSURE

A nest and stack container having ribs outstanding from the sides to support the container on its sides in position for dumping the contents by automatic dumping equipment, outwardly extending convolutions with vertical load carrying walls in direct straight line continuation of said walls to eliminate buckling under load and an inwardly extending surface on each of the end walls in the plane of the rim of the case to support the bottom of an upper container while it is being moved into stacking position.

---

This invention is a nest and stack plastic case for fruits, vegetables and the like which is constructed to increase the load carrying ability of the containers and thereby permits higher stacking heights of the filled containers. The container also has a wall construction which makes it easier to unload at food processing plants by automatic dumping equipment.

Figure 1:
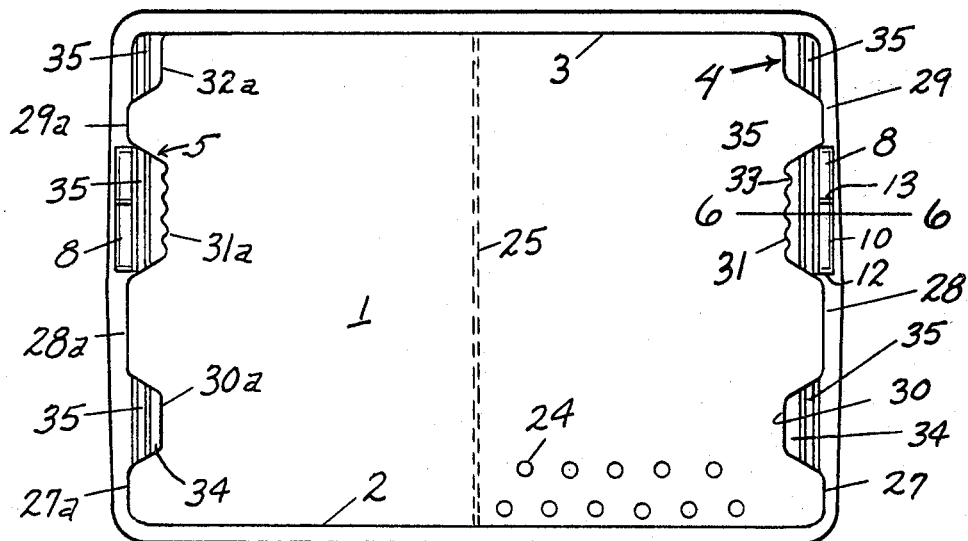
Figure 2:
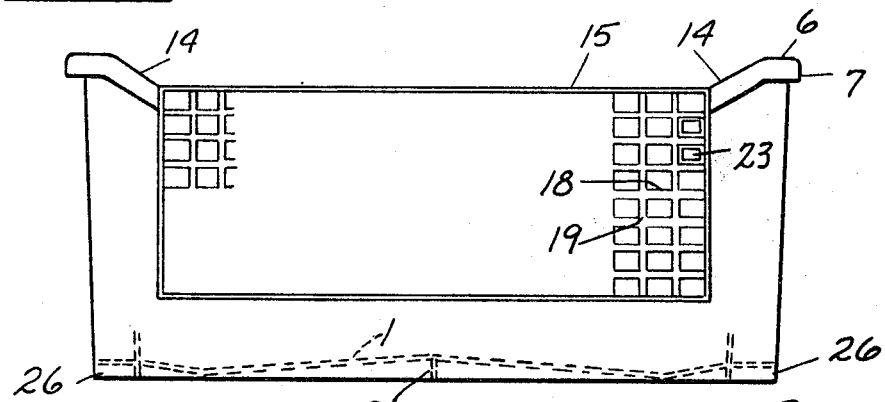
Figure 4:
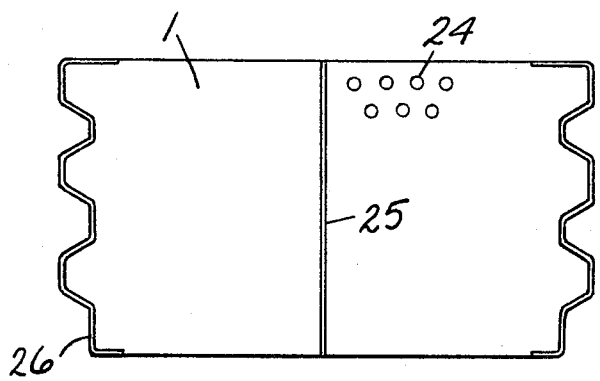
Figure 5:
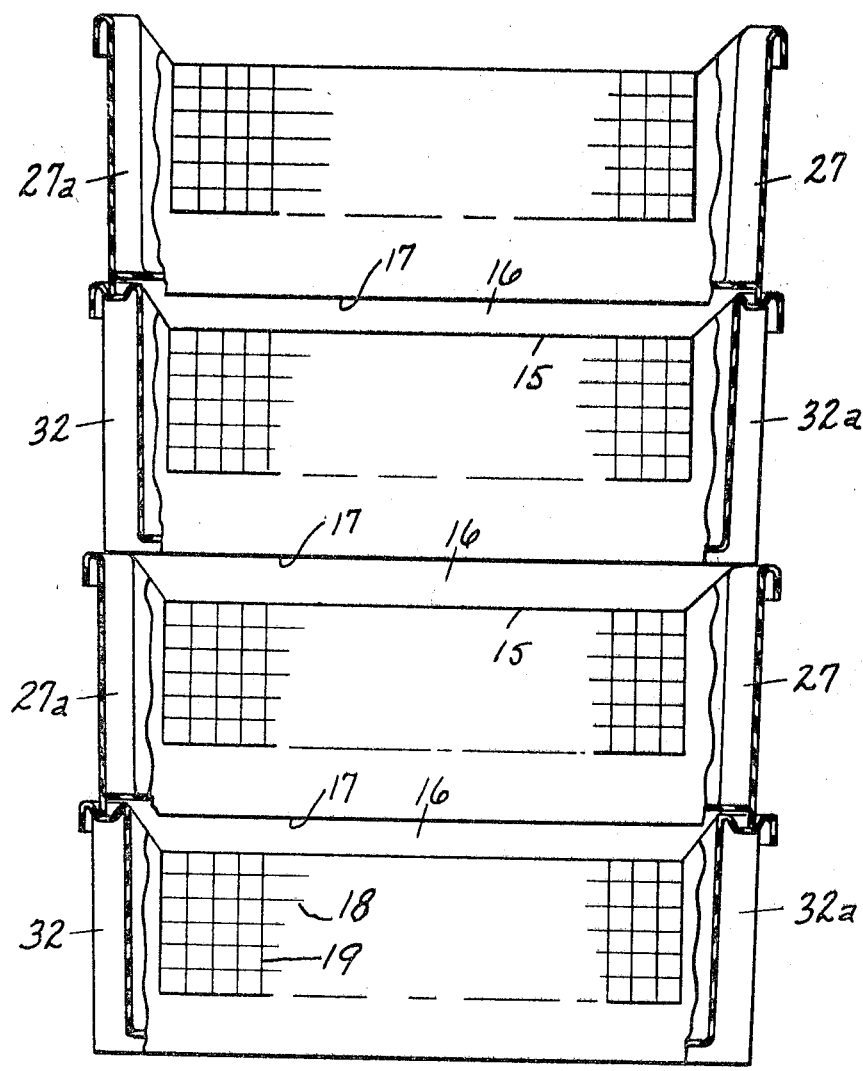
Figure 9:
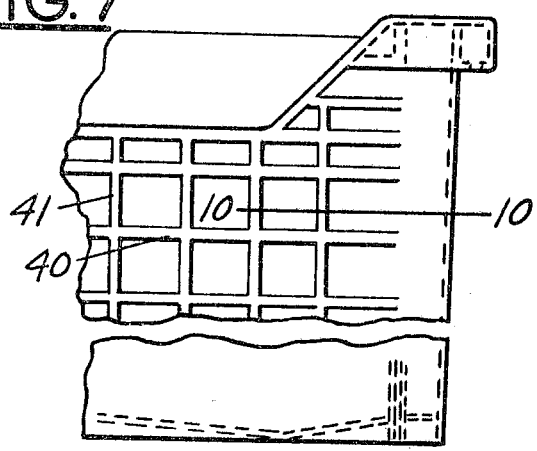
Figure 12:
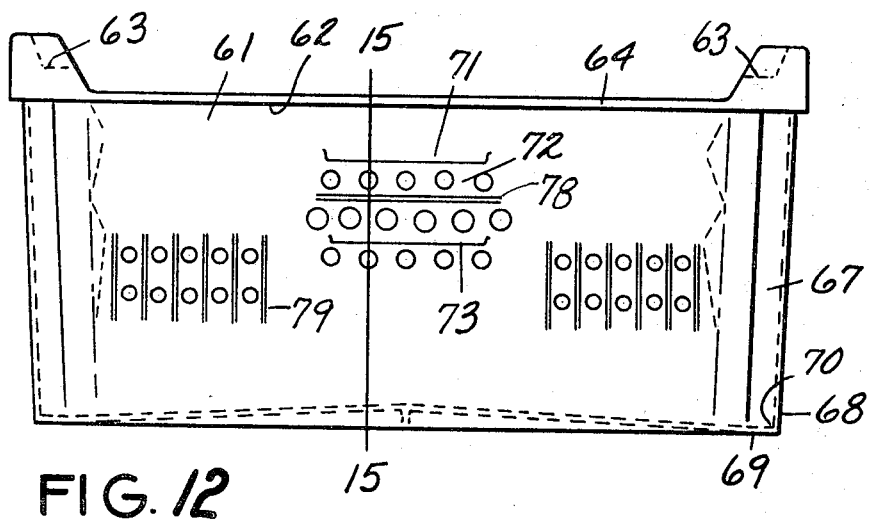
Figure 13:
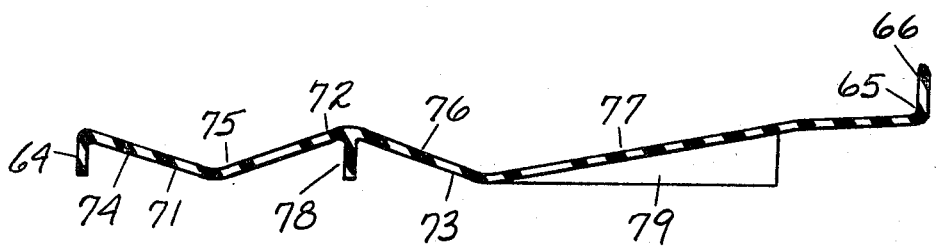

In the drawing, FIG. 1 is a top plan view of a plastic container, FIG. 2 is a side elevation, FIG. 3 is an end elevation, FIG. 4 is a bottom plan view, FIG. 5 is a side elevation of stacked containers, partly broken away, FIG. 6 is a section on line 6—6 of FIG. 1, FIG. 7 is a top plan view of a modification of the end wall contour, FIG. 8 is a section on line 8—8 of FIG. 7, FIG. 9 is a fragmentary elevation of a modification of the side wall construction, FIG. 10 is a section on line 10—10 of FIG. 9, FIG. 11 is a top plan view of another modification of the end wall contour, FIG. 12 is a side view of a nest and stack container with a side wall construction which may be substituted in FIG. 2, FIG. 13 is a section on line 15—15 of FIG. 12, FIG. 14 is a top plan view of a modification having end wall constructions which may be substituted in the previously described containers, FIG. 15 is an end view of the end elevation of the FIG. 14 container, and FIG. 16 is a section on line 18—18 of FIG. 14.

The container is molded in one piece from suitable plastic, such as polyethylene. It has a bottom wall 1 with edges integral with upstanding side walls 2, 3 and end walls 4, 5. Around the upper edges of the side and end walls is an outwardly projecting rim 6 bordered by a depending stiffening flange 7 except at the handle sections 8 at opposite ends of the case where the rim has a downwardly extending flange 9 joined at its lower end to a U section 10 (FIGS. 1, 6) providing at its outer surface a smooth hand grip section 11. The flange 9 and associated U section 10 are reinforced by vertical ribs 12 at the ends and a vertical rib 13 at the center. At the sides, the rim 6 has downwardly inclined sections 14 at each end and a generally horizontally center section at 15 which, when the containers are stacked as shown in FIG. 5, provides a space 16 between the center section of the rim and the lowermost portion 17 of the adjacent container in the stack. This space is available for dusting the fruit and vegetables and also for ventilation. This space has the further advantage of preventing crushing of the fruit when the containers are stacked, since the usual tendency is to fill the containers substantially to the level of the center section 15 of the rim.

The central section of the side walls comprises a grid of intersecting horizontal ribs 18 and vertical ribs 19 with the inner edges of the ribs integral with the side wall 2 or 3 as the case may be and with the outer edges of the ribs lying in a plane 20 which, as shown in FIG. 3, is at right angles to and includes the outermost portions of the rim 6. This means that when the container is turned on its side in position for dumping the contents by automatic dumping equipment, the top and bottom of the container each lie in a vertical plane. If the outstanding horizontal and vertical ribs 18 and 19 were eliminated, the container would tilt backward and would be more difficult to empty by automatic dumping equipment. This result is accomplished by having the ribs 18, 19 increase in height toward the bottom of the container so as to compensate for the draft of the side walls 2,3 required for molding. The height of the ribs 18, 19 also compensates for the projection of the rim 6 which also tends to cause tilting of the container in the direction to make dumping more difficult. Instead of merely bringing the top container into a vertical plane, it would be possible to have the box tilted slightly forward so as to make the dumping still easier. This would be done by having a further increase in the height of the ribs 18, 19 toward the bottom of the container.

The grid 18, 19 provides a very rigid wall construction which eliminates bulging of the side walls when the container is filled.

When empty containers are nested for storage, the lowermost horizontal rib 21 of an upper container rests on the uppermost horizontal rib 22 of a lower container, thus providing a nesting stop for the containers. The horizontal ribs 18 may be omitted. The ribs 19 will stiffen the side wall and will support the container on its side in position for emptying by automatic dumping equipment.

As shown in FIGS. 2 and 3, openings 23 may be provided in the side walls within the area bounded by the horizontal and vertical ribs 18 and 19. These openings provide ventilation of the contents of the container. If some of the ribs 18 are omitted, the openings may be enlarged.

The bottom wall 1 of the container has a smooth upper surface provided with drain openings 24. At the center, there is a cross rib 25 which stiffens the bottom wall and also provides a slight crowning of the upper surface. At the ends of the bottom wall is a depending rib 26 in substantially direct straight line continuation of the side and end walls 4, 5 (FIG. 6). The purpose of the rib 26 is to increase the load carrying ability of the side and end walls and thereby permit stacking of filled containers to greater heights.

The end walls of the containers have alternate inwardly and outwardly extending convolutions. The outwardly extending convolutions are designated by the numerals 27, 27a, 28, 28a and 29, 29a. The inwardly extending convolutions are designated by the numerals 30, 30a, 31, 31a, and 32, 32a. The outwardly extending convolutions are open at the top and closed at the bottom. The outwardly extending convolutions are part of the usable capacity of the container. Because of the draft required for plastic molding, the outwardly extending convolutions are wider at the top than at the bottom. The inwardly extending convolutions are closed at the top and open at the bottom and for similar reasons the inwardly extending convolutions are narrower at the top than at the bottom. There is a similar draft of the side walls 2, 3 and end walls 4, 5 which slope inwardly from the top to the bottom. This draft or taper is inherent in plastic molding. The side walls of both the inwardly and outwardly extending convolutions may be provided with vertical stiffening corrugations as shown at 33 on the convolutions 31, 31a in FIG. 1 or the corrugations may be omitted as shown in the other convolutions in FIGS. 1 and 4.

Each of the walls 34 closing the upper ends of the inwardly extending convolutions 30–32a inclusive is provided with an open ended groove 35 (FIGS. 1, 6). The purpose of the groove is to receive the depending rib 26 of an upper container when the containers are stacked. In order to stack the containers, it is necessary that alternate containers be turned end for end. When this is done, the ribs 26 on the outwardly projecting convolutions 29, 29a are received respectively in the grooves 35 of the inwardly extending convolutions 30, 30a, the ribs 26 at the lower end of the outwardly extending convolutions 28, 28a are received in the grooves 35 of the inwardly extending convolutions 31, 31a and the ribs 26 at the lower end of the outwardly projecting convolutions 27, 27a are received in the grooves 35 of the inwardly projecting convolutions 32, 32a. This establishes direct load transmitting connection at each end of the container between an outwardly projecting convolution of an upper container and an inwardly projecting convolution of the next lower container.

When the containers are stacked, only half the convolutions are used for carrying load. Accordingly, it is important that the load carrying ability be increased so as to permit greater stacking heights of the containers. In this container, the load carrying ability is effectively doubled by merely adding the depending rib 26 at the lower end of each of the outwardly projecting convolutions 27–29a. These are the convolutions which transmit the load from an upper container to the next lower container when stacked as in FIG. 5. When the ribs 26 are present, the load carrying ability is substantially doubled. Stated differently, the loaded containers may be stacked to twice the height when the ribs 26 are present on the lower ends of the outwardly extending convolutions. It is convenient to have the rib 26 extend around the entire periphery of the ends of the case and be a straight line continuation of the end wall. However, if only the load carrying ability were desired, the ribs 26 could be confined to the outwardly projecting convolutions.

The grooves 35 in the top walls of the inwardly extending convolutions locate the stacked cases and prevent side and endwise shifting of the cases in the stack. The ribs 26 overlap the ends of the grooves 35 and prevent side and endwise shifting of the cases in the stack.

FIG. 5 shows a side elevation of four cases in stacked relation. Note that in each case there is a load transmitting connection from an outwardly projecting convolution such as 27 to an inwardly projecting convolution such as 32a while there is no load carrying connection from an inwardly projecting convolution to an underlying, outwardly projecting convolution. FIG. 5 shows the clearance space 16 between adjacent cases in the stack for ventilation and dusting.

FIGS. 7 and 8 show a modification of the end wall contour having five outwardly projecting convolutions 36, each closed at the bottom and open at the top, and five inwardly projecting convolutions 37, each closed at the top and open at the bottom, and provided at the top with an open ended transverse groove 38. The opposite end of the case would be of identical construction with the outwardly extending convolutions at one end opposite the outwardly extending convolutions at the opposite end. When the cases are turned end for end, each of the outwardly extending convolutions 36 comes into load carrying relationship with an underlying, inwardly extending convolution 37 and a depending rib 39 at the lower end of each outwardly extending convolution fits into the groove 38, thereby establishing the desired load carrying relationship, shown in the fragmentary sectional view, FIG. 8.

FIGS. 9 and 10 show a modification of the side wall construction in which the horizontal and vertical ribs 40 and 41 are joined to each other at the intersections and the inner edges 42 of the ribs as shown in FIG. 10 form a smooth continuation of the inner surface 43 of the side wall of the container.

FIG. 11 shows an alternate end wall contour having outwardly extending convolutions 44, 45, 46 and inwardly extending convolutions 47, 48, 49. Each of the outwardly extending convolutions 44, 45, 46 is directly opposite another similar outwardly extending convolution at the opposite end of the case and the same is true of the inwardly extending convolutions 47, 48, 49. When an underlying case is rotated 180°, the outwardly extending convolutions 44, 45, 46 come into load carrying relation with underlying, inwardly extending convolutions 47, 48, 49 and the depending ribs (not shown) on the outwardly extending convolutions fit into the slots or grooves 50 in the upper ends of the inwardly extending convolutions. The primary difference between FIG. 11 and FIG. 1 is in the shape of the corrugations 51 of the vertical walls of the inwardly and outwardly extending convolutions. The purpose of the shape is to increase the stiffness.

FIGS. 12 and 13 show an alternative side wall construction which may be substituted in any of the previously described containers. The side wall 61 has a depressed central section 62 which occupies the major portion of the length of the side walls and is sufficiently lower than the load carrying surfaces 63 of the end walls to provide the space between adjacent containers when in stacked relation as shown in FIG. 5. The upper edge of the side walls has a rim 64 and the lower edge of the side wall is joined by a radius 65 to the container bottom wall 66. The radius 65 is satisfactory because when the containers are stacked, no load is transmitted through the radius. When stacked, the load is carried by the outward convolutions 67, each having a vertical load transmitting wall 68 which joins the bottom wall 69 with a sharp corner 70 so that the load is transmitted straight down the wall 68 without any offset which could cause buckling.

As shown in FIG. 13, the side wall has an average inward taper from the rim 64 to the bottom wall 66. However, it is stiffened by lengthwise extending rib sections 71, 72, 73. The rib 71 is formed by the intersection of longitudinally extending tapered wall sections 74, 75, the rib 72 is formed by longitudinally extending wall sections 75 and 76, the rib 73 is formed by longitudinally extending wall sections 76 and 77. At the intersection of the wall sections 75 and 76 there is an outwardly extending horizontal rib 78. On the outer surface of the wall section 77 are a plurality of tapered, vertical, outwardly projecting ribs 79. When the container is turned on its side, the rim 64 and the outermost portions of the ribs 71, 73, 78 and 79 all lie in a common, horizontal plane at right angles to the rim 64 so that when the container is turned on its side, the rim of the container lies in a vertical plane and the container is more easily dumped by automatic dumping equipment. The rim of the container need not lie in an absolutely vertical plane. The ribs 71, 73, 78 and 79 may be arranged so that the plane of the rim 64 tilts forward for still greater ease in dumping or even slightly backward. The rather gradual slopes of the wall sections 74, 75, 76 and 77 provide relatively smooth inner wall surfaces which prevent damage to delicate fruits. The lower ends of the ribs 79 serve as nesting stops.

The container of FIGS. 14 to 16 has a bottom wall 80 with its outer edges joined to upstanding side and end walls 81 and 82 tapering outwardly and having upper edges terminating in a rim 83. As shown in FIG. 15, the rim for each of the side walls has a drop center 84 having the same function as the section 15 in FIGS. 2 and 5. As shown in FIG. 16, the rim 83 at the end walls is straight and parallel to the bottom wall. The rim for the end walls and for the adjacent sections 85 of the side walls is preferably formed by a turned over section 86.

The side walls 81 are shown as nominally flat but obviously may be ribbed and perforated as in the previously described containers. The end walls have a series of outwardly extending convolutions 87, 88, 89, 90, 91 at one end of the container and 87a, 88a, 89a, 90a, 91a at the opposite end of the container. The outwardly extending convolutions are open at the top and each convolution at one end of the container is opposite and identical outwardly extending convolutions at the opposite end of the container. Adjacent the outwardly extending convolutions are inwardly extending convolutions 92, 93, 94, 95 and 96 at one end of the container and 92a, 93a, 94a, 95a and 96a at the opposite end of the container. Each of the inwardly extending convolutions at one end of the container is directly opposite an inwardly extending convolution at the opposite end of the container. The inward and outward convolutions are tapered from top to bottom, the inward convolutions being narrowest at the top and the outward convolutions being widest at the top. Each of the inward convolutions terminates below the upper edge of the rim 83 and as shown in FIG. 16, each is closed at its upper end by a shelf or stacking abutment 97.

At the central part of each end wall is an inwardly extending convolution 98, 98a, each wider at the bottom than at the top and each having its top closed by a shelf 99, 99a substantially in the plane of the rim as shown in FIG. 16. Below each shelf 99, 99a is a wall 100 connected to the under side of the shelf by ribs 101. The purpose of the wall 100 is to serve as a hand grip.

When upper and lower containers are oriented in like manner, the containers nest into each other. When nested, like numbered convolutions 87–96 and 98 and 87a–96a and 98a register with each other and an upper container telescopes into a lower container as shown in FIG. 15 where the container A is shown telescoped into a lower container indicated by dotted lines and designated by B. Nesting of the containers saves space for storage.

When alternate containers have the orientation shown in FIG. 16 and intermediate containers are rotated 180° about an axis perpendicular to the bottom wall 80, the containers stack one on top of the other as shown in FIG. 15 where container C is shown stacked on container A. The container C is rotated about an axis perpendicular to the bottom wall 80 through 180°, bringing outward convolution 91a over the upper end of inward convolution 92 and bringing outward convolution 91 over the upper end of inward convolution 92a. Similarly, outward convolutions 90, 89, 88 and 87 of the container C are brought into register with the upper ends of inward convolutions 93a, 94a, 95a and 96a and outward convolutions 90a, 89a, 88a, 87a are brought into register with inward convolutions 93, 94, 95 and 96. The reason for this is that the inward and outward convolutions at one end of each container are unsymmetrically disposed about an axis perpendicular to the bottom wall of the container. The lower ends of the outward convolutions of the container C accordingly stack upon the upper ends of the inward convolutions of the container A. Each of the upper ends of the inward convolutions is closed by a shelf or wall 97 which provides a supporting surface on which the lower ends of the outward convolutions of the container C rest.

Because the convolutions 98 and 98a are symmetrical about an axis perpendicular to the bottom wall 80 of the container, the convolutions 98 and 98a nest whether in the position shown in FIG. 14 or whether rotated 180° from the position shown in FIG. 14. Stated differently, the convolutions 98 and 98a of the containers C, A and B are all in nesting relation. The convolutions 98 and 98a of the container C do not nest because of the stacking abutments of the other inward and outward convolutions. The purpose of the convolutions 98 and 98a is to assist in guiding the containers into stacking relation. As shown in FIG. 18, a container D is being moved into stacking relation with a container E. This movement is facilitated by the supporting surface 99 provided by the upper end of the convolutions 98 and 98a which is located in the plane of the rim 83 of the container and cooperates with the bottom wall 80 of the container D to provide a support which permits the bottom wall of the container D to slide over the underlying container E and to be easily moved into stacking position. Upon reaching stacking position, the lower ends of the convolutions 98 and 98a come respectively into register with the upper ends of the convolutions 98a and 98 and the container D drops down into stacking position in which its lower end is telescoped below the rim 83 and sidewise shifting of the containers in the stack is thereby prevented. The support provided by the convolutions 98 and 98a greatly facilitates the stacking of containers. Containers are not stacked unless loaded. Without the support provided by the convolutions 98 and 98a, it would be necessary to lift an upper container such as that shown in D into registering with the lower container such as shown at E before lowering the container D into stacking position. By making use of the support supplied by the convolutions 98 and 98a, the major part of the weight of the container D is carried by the rim 83 of the container E while the container D is being manipulated into stacking position. The convolutions 98, 98a project inward further than the convolutions 92–96 and 92a–96a and substantially the entire surfaces 99, 99a are opposite elevated sections 102, 102a of the rim 83. This provides additional support for a container being stacked.

What is claimed as new is:

1. In a nest and stack container having a bottom wall bounded by upstanding side and end walls, said side and end walls being constructed to nest and having alternatively engageable stacking abutments, the improvement which comprises said side walls having the upper edges depressed at the central portion throughout a major portion of the length of the side walls below the upper edges of the end walls to provide a space between the depressed section and the lowermost portion of an overlying stacked container, and ribs outstanding from the outer surfaces of the side walls below said depressed central portion, said ribs having nesting stop portions adapted to engage the depressed central portion of the side walls of an underlying nested container.

2. In a container adapted to stacking one on top of the other, said container having a bottom wall bounded by upstanding peripheral walls having a plurality of vertical inwardly extending convolutions and a plurality of vertical outwardly extending convolutions, a plurality of said containers when stacked having inwardly extending convolutions of a lower container underlying in supporting relation outwardly extending convolutions of an upper container, the improvement which comprises said outwardly extending convolutions having vertical load carrying walls with load transmitting structure at the lower end thereof depending below the adjacent portion of the bottom wall in direct straight line continuation of said load carrying walls to eliminate buckling under load, and seats at the upper ends of said inwardly extending convolutions directly below and in direct continuation of said load transmitting structure.

3. A container of the type adapted for stacking on an identical lower container, said container having a bottom wall bounded by upstanding side and end walls diverging from the bottom wall to a rim at the upper edges, said container having a stacking position relative to an identical lower container in which the bottom wall of said container is telescoped within the rim of said lower container, stacking abutments at the upper and lower ends of the container, the stacking abutments at the lower end of said container engaging the stacking abutments at the upper end of said lower container and supporting said container with its bottom wall below the rim of said lower container, inwardly extending supporting surfaces on said walls substantially in the plane of the rim in the bottom wall below and registering and above the stacking abutments at the upper end of said container, said inwardly extending surfaces cooperating with the lower end of an identical upper container to guide said upper container into stacking position on said container.

4. The container of claim 3 also having a nesting position relative to said lower container in which the stacking abutments are out of engagement and the bottom wall of said container is telescoped further below the rim of said lower container than in said stacking position, and the supporting surfaces of said lower container fitting in the recesses of said container in both the nesting and stacking positions.

5. The container of claim 3 in which said container has recesses in its bottom wall registering with said supporting surfaces of a lower container in stacking position whereby when in said stacking position the supporting surfaces of said lower container fit into the recesses of said container.

6. The container of claim 5 in which each end wall has an inwardly extending vertical tapered convolution narrower at the top than at the bottom and said supporting surface is at the top of said convolution and said recess is at the bottom of said convolution.

7. The container of claim 4 in which each end wall has an inwardly extending vertical tapered convolution narrower at the top than at the bottom and said supporting surface is at the top of said convolution and said recess is at the bottom of said convolution.

References Cited

UNITED STATES PATENTS

| | | | |
|---|---|---|---|
| D. 197,311 | 1/1964 | Spaak | 220—97 X |
| 2,823,828 | 2/1958 | Frater | 220—97 |
| 3,147,882 | 8/1964 | Waters | 220—97 |
| 2,823,829 | 2/1958 | Frater | 220—97 |

FOREIGN PATENTS

| | | |
|---|---|---|
| 231,343 | 1/1964 | Austria. |
| 1,325,031 | 3/1963 | France. |
| 590,653 | 4/1959 | Italy. |
| 979,205 | 1/1965 | Great Britain. |
| 999,923 | 7/1965 | Great Britain. |
| 1,363,498 | 5/1964 | France. |
| 392,369 | 9/1965 | Switzerland. |

GEORGE E. LOWRANCE, *Primary Examiner.*